1

3,383,267
METHOD FOR THE MANUFACTURE OF PRODUCTS OF RESIN IMPREGNATED, FIBROUS MATERIAL
Nils B. Sundén, Perstorp, Sweden, assignor to Perstorp AB, Perstorp, Sweden
No Drawing. Filed June 6, 1963, Ser. No. 300,401
Claims priority, application Sweden, June 8, 1962, 6,428/62
7 Claims. (Cl. 156—335)

The present invention relates to a method for the manufacture of articles of resin impregnated, fibrous material, particularly plastic laminates, e.g. decorative plastic laminates. The object of the invention is to improve the properties of such products, especially in order to decrease the so called flame spread, i.e. the tendency of the material to propagate fire in extremely hot surroundings. The expression fibrous material designates in the first place combustible materials such as paper and textile fibres. For the use of wall covering materials in official localities and communication means predetermined minimum requirements with respect to the combustability of the material must be fulfilled. Norms have been issued in different countries, and testing methods have been developed for determining the flame spread properties.

Standard type decorative plastic laminate consists of a core of several laminated paper sheets impregnated with phenolic resin and decorative overlay sheets of paper impregnated with melamine resin. Such laminates have excellent properties in many respects and are widely used as top cover for desks, tables and other furniture and as wall covering material. However, the standard type decorative laminates usually show too high so called flame spread values. It has been suggested to eliminate this drawback by certain measures, i.e. by use of special fire retardant substances or by the use of incombustible fillers. Ammonium phosphates are often used as a fire retardant substance. When using such a substance the fibrous material is first impregnated by a water solution of the phosphate, whereafter the fibrous material is dried and then impregnated by a suitable thermosetting resin and again dried. In the case of plastic laminates, where the fibrous material is in the form of paper sheets, a predetermined number of such sheets treated as described above, is laminated in the conventional manner, whereby a laminate is obtained, which meets the predescribed requirements for high quality standard with respect to flame spread. However, this two-step method is relatively expensive and may be avoided by using the method according to the present invention.

It has turned out that phosphates of certain amines and aminoalcohols are soluble in resins used for the manufacture of plastic laminates, the solubility being so high that the prevailing standards with respect to flame spread can be maintained by impregnating the paper in one step with a resin containing such phosphates. In this respect, said phosphates of certain amines and aminoalcohols differ from known phosphates of ammonium. Among the amine compounds showing the desired properties in said respect, mono-, di- and trimethylamine, monoethylamine, diethylenetriamine and monoethanolamine may be mentioned.

A method according to the invention for the manufacture of resin impregnated fibrous material, particularly plastic laminate, is characterized in that phosphates of amines having an atom ratio carbon/nitrogen of 1–3 i.e. a carbon/nitrogen ratio of 1, 2, or 3, is added to the resin used for impregnating the fibrous material.

These phosphates of amines have the desired combination of properties, especially if the ratio of equivalence between amine and phosphoric acid lies between 1.2:3 and 2.5:3. The amine component may also contain other substituents such as hydroxyl and halogen, which do not actively take part in combustion.

Example.—Manufacture of decorative plastic laminate

A resin of synthetic phenol was produced according to the following recipe:

| | Mols |
|---|---|
| Phenol | 1 |
| Formaldehyde | 1.2 |
| Water | 4.5 |
| Sodium hydroxide | 0.025 |

The condensation was carried out at 80–100° C. and was interrupted when the quantity of free formaldehyde in the reaction mixture had decreased to 20 g. per litre. After the resin solution had been cooled to 30° C., it was diluted with sulphite alcohol to a dry content of 40%, whereafter 10 parts monoethanolamine and, during cooling, 10 parts phosphoric acid (85%) was added to 100 parts of the resin so that the pH-value of the resin as measured with glass electrode was equal to 6.5. The resin obtained may be stored for more than 30 days without quality deterioration.

The resin produced according to the method described above was used for impregnating kraft paper in known manner so that a resin content, calculated on the weight of the impregnated and dried paper, of 45% was obtained. The impregnated paper was dried, and the loss of volatizable substances during afterdrying at 150° C. for 10 minutes was 5%. This paper was used for building up the core of a sheet of decorative plastic laminate, which in other respects was produced according to known technique. The resulting product fulfilled with good margins the requirements with respect to flame spread according to existing norms (Bulletin No. 123, issued by the official Swedish materials testing institute Statens Provningsanstalt).

The surface sheets of the decorative laminate impregnated with melamine resin may also be treated according to the invention for increasing the quality of the laminate with respect to flame spread.

I claim:
1. In the method for manufacture of plastic laminates from paper sheets impregnated with a phenol-formaldehyde resin, the improvement which comprises adding to said resin, prior to impregnating the paper sheets, a salt formed from phosphoric acid and an amine having a carbon/nitrogen ratio of 1–3.

2. The improvement of claim 1 wherein said phosphoric acid and said amine are combined in an equivalent ratio of between 3:1.2 and 3:2.5.

3. The improvement of claim 1 wherein said amine is selected from the group consisting of monoethanolamine, monomethylamine, dimethylamine, trimethylamine, monoethylamine, and diethylenetriamine.

4. A method for the production of plastic laminate cores having low flame-spread value comprising the steps of (1) impregnating paper sheets with a phenol-formaldehyde resin containing a salt of an amine having a carbon/nitrogen atom ratio of 1–3 and phosphoric acid, (2) drying the impregnated paper sheets, and (3) building up the cores with said impregnated paper sheets.

5. The method of claim 4 wherein at least one additional sheet is impregnated with a melamine-formaldehyde resin containing said amine-phosphate salt, said melamine-formaldehyde resin impregnated sheet being assembled along with said phenol-formaldehyde resin impregnated sheets.

6. The method according to claim 4 in which said amine is at least one selected from the group consisting of monoethanolamine, monomethylamine, dimethylamine, monoethylamine, and diethylenetriamine.

7. The method according to claim 4, wherein said phosphoric acid and said amine are combined in an equivalent ratio of between 3:1.2 and 3:2.5.

References Cited

UNITED STATES PATENTS

| | | | |
|---|---|---|---|
| 3,247,134 | 4/1966 | Hwa et al. | 260—45.9 |
| 2,676,162 | 4/1954 | Marotta. | |
| 3,013,049 | 12/1961 | Holtschmidt et al. | 260—944 |
| 3,121,731 | 2/1964 | Quensel et al. | 260—944 |

FOREIGN PATENTS

| | | |
|---|---|---|
| 158,328 | 8/1954 | Australia. |
| 547,396 | 1/1954 | Canada. |

EARL M. BERGERT, *Primary Examiner.*

LEON J. BERCOVITZ, *Examiner.*

H. E. TAYLOR, J. P. MELOCHE, D. J. FRITSCH,
*Assistant Examiners.*

UNITED STATES PATENT OFFICE
CERTIFICATE OF CORRECTION

Patent No. 3,383,267　　　　　　　　　　　　　　May 14, 1968

Nils B. Sundén

It is certified that error appears in the above identified patent and that said Letters Patent are hereby corrected as shown below:

Column 3, line 2, after "dimethylamine," insert -- trimethylamine, --.

Signed and sealed this 4th day of November 1969.

(SEAL)
Attest:

Edward M. Fletcher, Jr.　　　　　　　　　WILLIAM E. SCHUYLER, JR.
Attesting Officer　　　　　　　　　　　　　　Commissioner of Patents